UNITED STATES PATENT OFFICE.

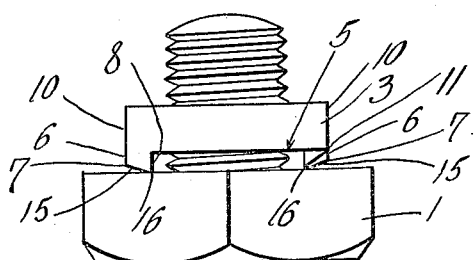
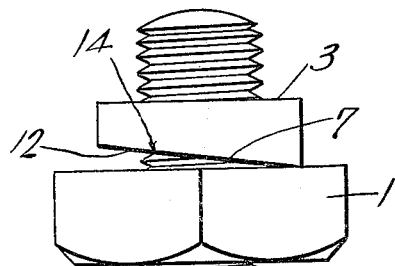
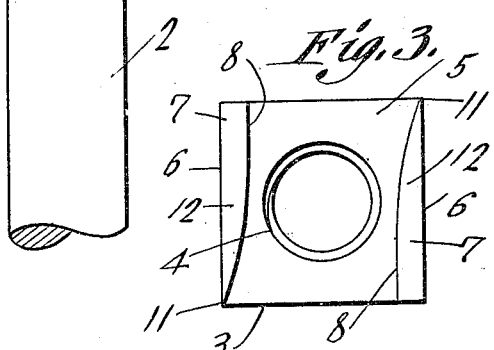
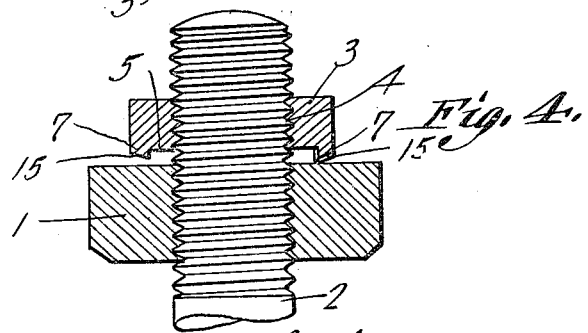
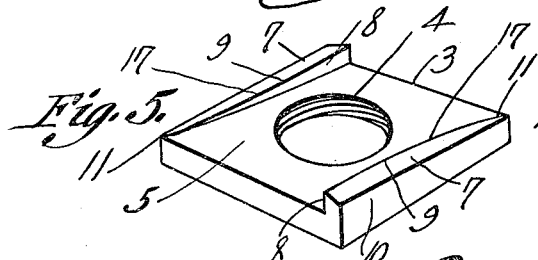

SAMUEL C. BAUGHN, OF CANALOU, MISSOURI, ASSIGNOR OF ONE-HALF TO JOHN M. JONES, OF CANALOU, MISSOURI.

NUT-LOCK.

1,272,763.   Specification of Letters Patent.   Patented July 16, 1918.

Application filed April 15, 1918.   Serial No. 228,659.

*To all whom it may concern:*

Be it known that I, SAMUEL C. BAUGHN, a citizen of the United States, residing at Canalou, in the county of New Madrid and State of Missouri, have invented a new and useful Nut-Lock, of which the following is a specification.

The device forming the subject matter of this application is a nutlock, and the invention aims to provide a locking washer of novel form, adapted to engage and hold a nut against rotation.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figures 1 and 2 show, in side elevation, a nut and a bolt wherewith has been assembled, a locking washer the kind forming the subject matter of this application;

Fig. 3 is a plan showing the under face of the locking washer;

Fig. 4 is a longitudinal section of the structure shown in Figs. 1 and 2;

And Fig. 5 is a perspective of the locking washer.

The invention includes, in combination with a nut 1 and a bolt 2, a washer plate 3 threaded at 4, on the bolt 2 and provided on its under side 5 and at its outer edges 6 with oppositely disposed approximately parallel ribs 7, the inner surfaces 8 of the ribs being disposed, as shown at 9, at acute angles to the outer surfaces 10 of the ribs, and meeting the outer surfaces of the ribs, as shown at 11, at opposite ends of the ribs. The under surfaces 12 of the ribs 7 slant in opposite directions, longitudinally of the ribs, as shown at 14, and slant inwardly in opposite directions, transversely of the ribs, as shown at 15, to form, with the inner surfaces of the ribs, nut engaging edges 16 which slant in opposite directions, as indicated at 17, longitudinally of the ribs.

It will be obvious that when the washer plate 3 is rotated on the bolt 2, the edges 16, owing to the particular specific manner in which they are formed, will engage the nut 1 with unusual efficiency, and will hold the nut against rotating. If the washer plate 3 is sufficiently resilient, the washer plate will bow downwardly (Fig. 1) to a slight degree; when the washer plate is rotated, thereby enhancing the hold of the edges 16 on the nut 1.

Having thus described the invention, what is claimed is:—

The combination with a nut and bolt, of a washer plate threaded on the bolt and provided on its under side and at its outer edges with oppositely disposed approximately parallel ribs, the inner surfaces of the ribs being disposed at acute angles to the outer surfaces of the ribs and meeting the outer surfaces of the ribs at opposite ends of the ribs, the under surfaces of the ribs slanting in opposite directions longitudinally of the ribs and slanting inwardly in opposite directions transversely of the ribs to form, with the inner surfaces of the ribs, nut engaging edges which slant in opposite directions longitudinally of the ribs.

In testimony that I claim the foregoing as my own, I have hereto affixed my signature in the presence of two witnesses.

SAMUEL C. BAUGHN.

Witnesses:
B. D. EAKER,
EVERETT NELSON.

Copies of this patent may be obtained for five cents each, by addressing the "Commissioner of Patents, Washington, D. C."